United States Patent
Choi et al.

(10) Patent No.: US 12,394,881 B2
(45) Date of Patent: Aug. 19, 2025

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Byung Jin Choi, Incheon (KR); Won Hee Lee, Incheon (KR); Jae Hyun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 516 days.

(21) Appl. No.: 17/838,660

(22) Filed: Jun. 13, 2022

(65) Prior Publication Data

US 2022/0302573 A1 Sep. 22, 2022

Related U.S. Application Data

(63) Continuation of application No. PCT/KR2020/017826, filed on Dec. 9, 2020.

(30) Foreign Application Priority Data

Dec. 13, 2019 (KR) .................. 10-2019-0166629

(51) Int. Cl.
 *H01Q 1/42* (2006.01)
 *H01Q 1/22* (2006.01)
 *G06F 1/16* (2006.01)

(52) U.S. Cl.
 CPC ........... *H01Q 1/2266* (2013.01); *H01Q 1/422* (2013.01); *G06F 1/1698* (2013.01)

(58) Field of Classification Search
 CPC ...... H01Q 1/2266; H01Q 1/422; H01Q 1/243; H01Q 1/48; H01Q 5/42; H01Q 1/38; H01Q 1/36; G06F 1/1698; G06F 1/1626
 See application file for complete search history.

(56) References Cited

U.S. PATENT DOCUMENTS 10,700,430 B1 * 6/2020 Abbasi .................. H01Q 1/38

FOREIGN PATENT DOCUMENTS

| CN | 107278342 | A | 10/2017 |
| CN | 109661751 | A | 4/2019 |
| CN | 214254711 | U | 9/2021 |
| DE | 19823749 | A1 | 12/1999 |
| JP | H10-209749 | A | 8/1998 |
| JP | 2004-112397 | A | 4/2004 |
| JP | 2005-137024 | A | 5/2005 |
| JP | 2017-175540 | A | 9/2017 |
| KR | 10-2011-0090226 | A | 8/2011 |

(Continued)

OTHER PUBLICATIONS

International Search Report for PCT/KR2020/017826 mailed on Mar. 26, 2021.

(Continued)

*Primary Examiner* — Marcos L Torres (74) *Attorney, Agent, or Firm* — The PL Law Group, PLLC (57) ABSTRACT

An antenna device according to an embodiment of the present invention includes a dielectric layer, and a plurality of a first antenna unit and a plurality of a second antenna unit alternately and repeatedly disposed on a top surface of the dielectric layer. The first antenna unit and the second antenna unit have different lengths or areas from each other.

15 Claims, 5 Drawing Sheets

(56) References Cited

FOREIGN PATENT DOCUMENTS

| | | |
|---|---|---|
| KR | 10-2013-0095451 A | 8/2013 |
| KR | 10-2016-0080444 A | 7/2016 |
| KR | 10-1940797 B1 | 1/2019 |
| KR | 101962820 B1 * | 3/2019 ............. H01Q 1/38 |
| KR | 10-2019-0089515 A | 7/2019 |
| KR | 10-2019-0108464 A | 9/2019 |
| WO | WO 2019/172631 A1 | 9/2019 |

OTHER PUBLICATIONS

Notice of Allowance issued on Apr. 29, 2021 from Korean Patent Office in a counterpart Korean Patent Application No. 10-2019-0166629 (all the cited references are listed in this IDS.) (English translation is also submitted herewith.).

* cited by examiner

ANTENNA DEVICE AND DISPLAY DEVICE INCLUDING THE SAME

CROSS-REFERENCE TO RELATED APPLICATION AND CLAIM OF PRIORITY

The present application is a continuation application to International Application No. PCT/KR2020/017826 with an International Filing Date of Dec. 9, 2020, which claims the benefit of Korean Patent Applications No. 10-2019-0166629 filed on Dec. 13, 2019 at the Korean Intellectual Property Office, the disclosures of which are incorporated by reference herein in their entirety.

BACKGROUND

1. Field

The present invention relates to an antenna device and a display device including the same. More particularly, the present invention relates to an antenna device including a plurality of radiators and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high frequency or ultra-high frequency communication is needed in the display device. As the display device becomes thinner and light-weighted, a space for accommodating the antenna may be also decreased.

Thus, a construction of an antenna for implementing the high frequency communication with a desired gain amount in a limited space is required.

Further, as various functions of communications and signals are implemented in the display device, an antenna structure capable of operating a plurality of frequency bands may be also needed. However, when an antenna operating band is shifted to a higher frequency, a radiation coverage may be decreased and an antenna driven at the plurality of frequency bands may not be easily employed in the limited space.

For example, Korean Published Patent Application No. 2013-0095451 discloses an antenna integrated into a display panel, but fails to consider an efficient implementation of a multi-band antenna.

SUMMARY

According to an aspect of the present invention, there is provided an antenna device having improved radiation property and signaling efficiency.

According to an aspect of the present invention, there is provided a display device including an antenna device with improved radiation property and signaling efficiency and having enhanced image quality.

(1) An antenna device, including: a dielectric layer; and a plurality of a first antenna unit and a plurality of a second antenna unit alternately and repeatedly disposed on a top surface of the dielectric layer, the first antenna unit and the second antenna unit having different lengths or areas from each other.

(2) The antenna device according to the above (1), wherein the second antenna unit has a resonance frequency greater than that of the first antenna unit, and the second antenna unit has an area or a length smaller than that of the first antenna unit.

(3) The antenna device according to the above (2), wherein the first antenna unit includes a first radiator, a first transmission line extending from one side of the first radiator and a first signal pad connected to an end portion of the first transmission line, and the second antenna unit includes a second radiator, a second transmission line extending from one side of the second radiator and a second signal pad connected to an end portion of the second transmission line.

(4) The antenna device according to the above (3), wherein an area of the first radiator is greater than an area of the second radiator, and a length of the first transmission line is greater than a length of the second transmission line.

(5) The antenna device according to the above (3), wherein the first radiators are arranged in a row direction to define a first row area, and the second radiators are arranged in the row direction to define a second row area, and the first row area and the second row area are separated so as not to overlap each other in a planar view.

(6) The antenna device according to the above (5), wherein the antenna device includes a bonding area in which the first signal pads and the second signal pads are disposed, and the bonding area, the second row area and the first row area are sequentially allocated so as not to overlap each other in the planar view.

(7) The antenna device according to the above (6), further including first ground pads disposed adjacent to each of the first signal pads and second ground pads disposed adjacent to each of the second signal pads in the bonding area.

(8) The antenna device according to the above (3), wherein the first radiator and the second radiator include a mesh structure.

(9) The antenna device according to the above (8), further including a dummy mesh pattern disposed around the first radiator and the second radiator on the top surface of the dielectric layer.

(10) The antenna device according to the above (8), wherein the first signal pad and the second signal pad include a solid metal pattern.

(11) The antenna device according to the above (2), wherein a spacing distance between neighboring first antenna units of the plurality of the first antenna unit is greater than a spacing distance between neighboring second antenna units of the plurality of the second antenna unit.

(12) The antenna device according to the above (11), wherein distances between the first antenna unit and the second antenna unit neighboring each other are non-uniform.

(13) The antenna device according to the above (1), further including a ground layer disposed on a bottom surface of the dielectric layer.

(14) The antenna device according to the above (1), further including a third antenna unit disposed on the top surface of the dielectric layer, the third antenna unit having a length or an area different from that of each of the first antenna unit and the second antenna unit.

(15) The antenna device according to the above (14), wherein lengths or areas of the first antenna unit, the second antenna unit and the third antenna unit are sequentially decreased, and the first antenna unit, the second antenna unit and the third antenna unit are sequentially, alternately and repeatedly arranged on the dielectric layer.

(16) The antenna device according to the above (1), wherein the antenna device includes a first antenna group including a plurality of the first antenna unit and a second antenna group including a plurality of the second antenna unit, and the first antenna group and the second antenna group are alternately and repeatedly arranged on the top surface of the dielectric layer.

(17) A display device comprising the antenna device according to the embodiments as described above.

According to exemplary embodiments of the present invention, antenna units having different sizes and/or lengths may be alternately and repeatedly arranged. Thus, an antenna structure having a plurality of resonance frequency bands may be implemented from one antenna array.

Additionally, a size of the entire array may be reduced while obtaining a spacing distance between the radiators corresponding to each frequency by using the alternating arrangement of the antenna units.

In some embodiments, signal loss may be further suppressed by relatively shortening a signal path of the antenna unit of a higher frequency band to an antenna driving integrated circuit chip.

DETAILED DESCRIPTION OF THE EMBODIMENTS

According to exemplary embodiments of the present invention, there is provided an antenna device including antenna units of different sizes which are alternately arranged.

The antenna device may be, e.g., a microstrip patch antenna fabricated in the form of a transparent film. The antenna device may be applied to communication devices for a mobile communication of a high or ultrahigh frequency band corresponding to a mobile communication of, e.g., 3G, 4G, 5G or more.

According to exemplary embodiments of the present invention, there is also provided a display device including the antenna device. An application of the antenna device is not limited to the display device, and the antenna device may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
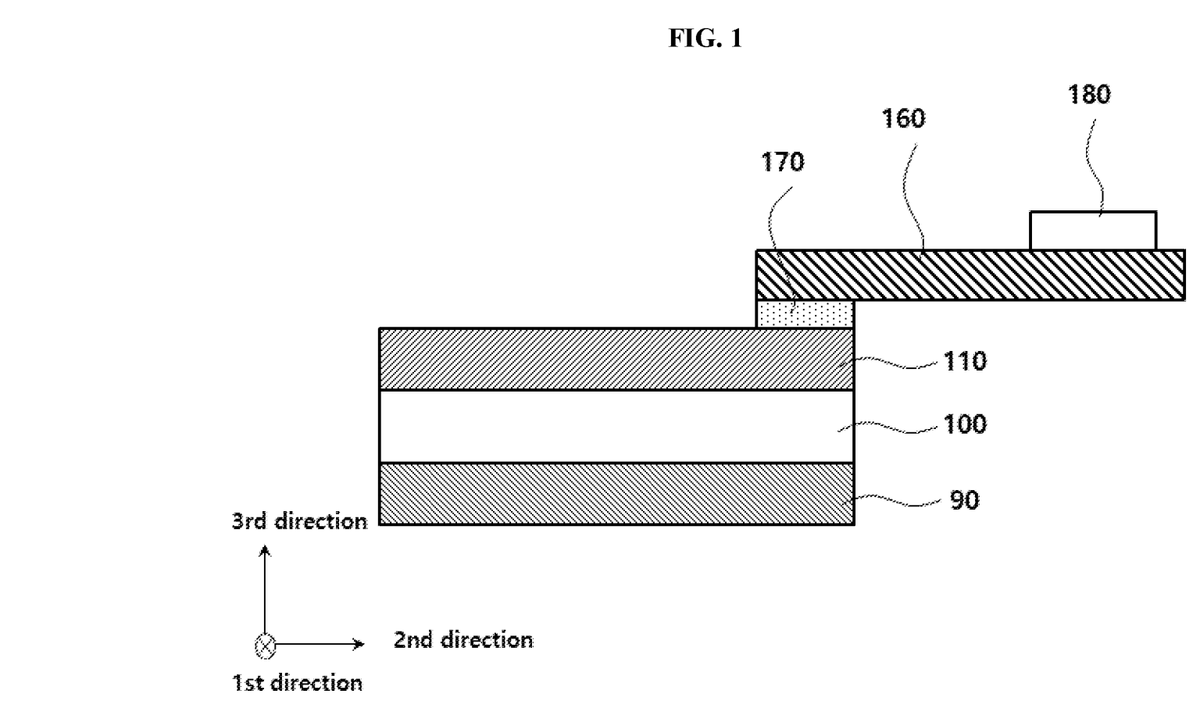
FIGS. 1 and 2 are a schematic cross-sectional view and a schematic top planar view, respectively, illustrating an antenna device in accordance with exemplary embodiments.
Figure 2:
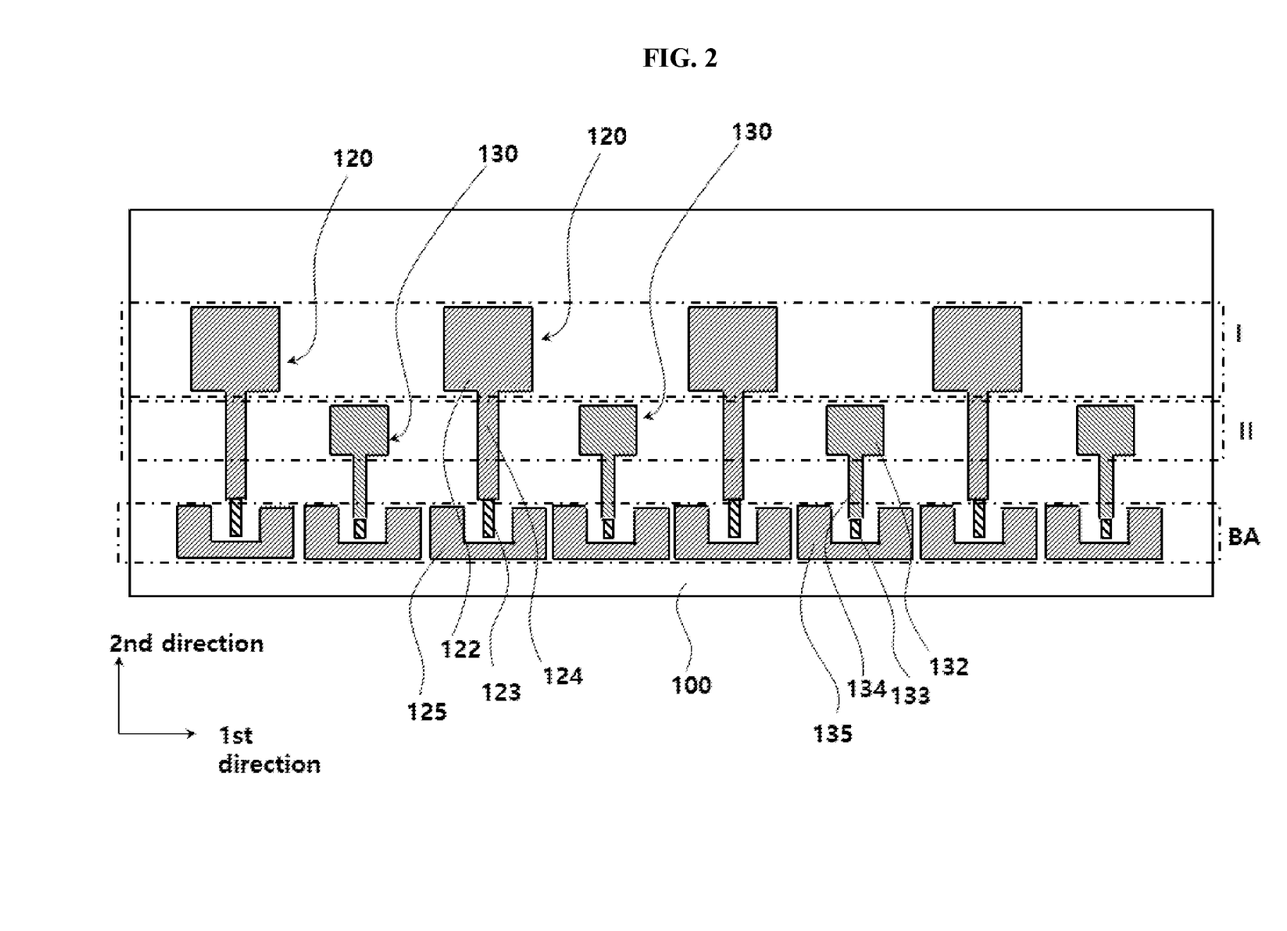

FIGS. 1 and 2 are a schematic cross-sectional view and a schematic top planar view, respectively, illustrating an antenna device in accordance with exemplary embodiments.

In FIGS. 1 and 2, two directions parallel to a top surface of a dielectric layer 100 and crossing each other are defined as a first direction and a second direction. For example, the first direction and the second direction may be perpendicular to each other. A direction vertical to the top surface of the dielectric layer 100 is defined as a third direction. For example, the first direction may correspond to a width direction of the antenna device, the second direction may correspond to a length direction of the antenna device and a third direction may correspond to a thickness direction of the antenna device. The definitions of the directions are applied to other accompanying drawings.

Referring to FIGS. 1 and 2, the antenna device may include a dielectric layer 100 and a first electrode layer 110 disposed on a top surface of the dielectric layer 100. The antenna device may further include a second electrode layer 90 disposed on a bottom surface of the dielectric layer 100.

The dielectric layer 100 may include an insulating material having a predetermined dielectric constant. The dielectric layer 100 may include, e.g., an inorganic insulating material such as glass, silicon oxide, silicon nitride or a metal oxide, or an organic insulating material such as an epoxy resin, an acrylic resin or an imide-based resin. The dielectric layer 100 may serve as a film substrate for the antenna device on which the first electrode layer 110 is formed.

The dielectric layer 100 may include a transparent film. For example, the transparent film may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

In some embodiments, an adhesive film such as an optically clear adhesive (OCA), an optically clear resin (OCR), or the like may be included in the dielectric layer 100.

In some embodiments, a dielectric constant of the dielectric layer 100 may be adjusted in a range from about 1.5 to about 12. When the dielectric constant exceeds about 12, a driving frequency may be excessively decreased, so that driving in a desired high frequency band may not be implemented.

As illustrated in FIG. 2, the first electrode layer 110 may include a plurality of antenna units each including a radiator and a transmission line.

In exemplary embodiments, the first electrode layer 110 may include a first antenna unit 120 and a second antenna unit 130 having different lengths from each other.

The first antenna unit 120 may include a first radiator 122, a first transmission line 124 extending from one side of the first radiator 122 and a first signal pad 123 connected to an end portion of the first transmission line 124.

A first ground pad 125 may be disposed around the first signal pad 123. For example, the first ground pad 125 may be electrically and physically separated from the first transmission line 124 and the first signal pad 123 and may include a recess. The first signal pad 123 may be at least partially inserted into the recess.

The second antenna unit 130 may include a second radiator 132, a second transmission line 134 extending from one side of the second radiator 132 and a second signal pad 133 connected to an end portion of the second transmission line 134.

A second ground pad 135 may be disposed around the second signal pad 133. For example, the second ground pad 135 may be electrically and physically separated from the second transmission line 134 and the second signal pad 133 and may include a recess. The second signal pad 133 may be at least partially inserted into the recess.

The signal pads 123 and 133, and the ground pads 125 and 135 may be arranged along the first direction to define a bonding area BA. The bonding area BA may be an area in which the antenna units 120 and 130 and an antenna driving integrated circuit (IC) chip 180 may be electrically connected to each other as illustrated in FIG. 1.

For example, wirings included in a flexible printed circuit board (FPCB) 160 and the signal pads 123 and 133 may be electrically connected at the bonding area BA. In an embodiment, a conductive intermediate structure 170 such as an anisotropic conductive film (ACF) may be inserted between the signal pads 123 and 133 and the wirings, and then the flexible printed circuit board (FPCB) 160 may be bonded or adhered to the antenna device by a heat-pressing process.

The antenna driving IC chip 180 may be disposed on the flexible printed circuit board (FPCB) 160. For example, the antenna driving IC chip 180 may be directly mounted on a surface of the flexible printed circuit board (FPCB) 160. A feeding may be performed from the antenna driving IC chip 180 to the transmission lines 124 and 134 through the wirings included in the flexible printed circuit board (FPCB) 160, and radiation/driving of the antenna units 120 and 130 may be controlled.

The first transmission line 124 and the second transmission line 134 may extend in the second direction, and a length in the second direction of the second transmission line 134 may be smaller than that of the first transmission line 124.

The first radiator 122 and the second radiator 132 may each have, e.g., a polygonal plate shape. The first radiator 122 and the second radiator 132 may serve as a single member substantially integrally connected to the first transmission line 124 and the second transmission line 134, respectively.

In some embodiments, an area of the first radiator 122 may be larger than that of the second radiator 132.

In exemplary embodiments, the first antenna units 120 and the second antenna units 130 may be alternately and repeatedly arranged along the first direction. For example, the second antenna unit 130 may be disposed between the neighboring first antenna units 120. The first antenna units 120 and the second antenna units 130 may be physically and independently arranged from each other.

When viewed in a planar direction, the first radiators 122 of the first antenna units 120 having a relatively large length may be farther away from the bonding area BA than the second radiators 132 of the second antenna units 130.

For example, the top surface of the dielectric layer 100 may include the bonding area BA, a second row area II and a first row area I which are sequentially positioned along the second direction.

The first radiators 122 may be repeatedly arranged in the first row area I along the first direction. The second radiators 132 may be repeatedly arranged in the second row area II along the first direction.

The first row area I and the second row area II may be substantially completely separated without overlapping each other as illustrated in FIG. 2 in the planar view. Accordingly, the first radiators 122 and the second radiators 132 may be independently radiated or driven substantially without a mutual interference.

According to the above-described exemplary embodiments, the antenna units having different sizes may be arranged in an array form in one antenna device, so that the antenna device having a plurality of resonance frequencies may be implemented while increasing a gain amount.

In exemplary embodiments, the first antenna unit 120 having a relatively large area/length may have a relatively small resonance frequency, and the second antenna unit 130 having a relatively small area/length may have a relatively large resonance frequency.

In an embodiment, the resonance frequency of the first antenna unit 120 may correspond to about 20 GHz to 30 GHZ (e.g., 28 GHz) band, and the resonance frequency of the second antenna unit 130 may correspond to about 30 GHz to 40 GHz (e.g., 38 GHz) band.

The second antenna units 130 of a relatively high frequency band may be disposed closer to the bonding area BA. Accordingly, a signal loss that may be caused more easily in a high frequency antenna may be suppressed or reduced.

Additionally, the first antenna units 120 and the second antenna units 130 may be alternately arranged, so that a spacing distance between the first radiators 122 and a spacing distance between the second radiators 132 required for the corresponding resonance frequencies may be achieved while reducing a length of the entire array.

The antenna units 120 and 130 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals.

For example, antenna units 120 and 130 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, antenna units 120 and 130 may include a transparent conductive oxide such as indium tin oxide (ITO), indium zinc oxide (IZO), indium zinc tin oxide (ITZO), zinc oxide (ZnOx), etc.

For example, antenna units 120 and 130 may have a multi-layered structure including a metal or alloy layer, and a transparent metal oxide layer. In some embodiments, the antenna units 120 and 130 may include a double-layered structure of a transparent conductive oxide layer-metal layer or a triple-layered structure of a first transparent conductive oxide layer-metal layer-second transparent conductive oxide layer.

The second electrode layer 90 may overlap the antenna units 120 and 130 in the third direction with the dielectric layer 100 interposed therebetween. The second electrode layer 90 may serve as, e.g., a ground layer of the antenna device, and a vertical radiation may be substantially implemented by the second electrode layer 90.

In some embodiments, the second electrode layer 90 may be included an individual element of the antenna device. In some embodiments, a conductive member of a display device to which the antenna device may be applied may serve as the ground layer.

For example, the conductive member may include various wirings or electrodes such as a gate electrode of thin film transistor (TFT), a data line, a scan line, a pixel electrode, a common electrode, etc., included in a display panel.

In an embodiment, a metallic member such as a SUS plate, a sensor member such as a digitizer, a heat dissipation sheet, etc., disposed at a rear portion of the display device may serve as the ground layer.

Figure 3:
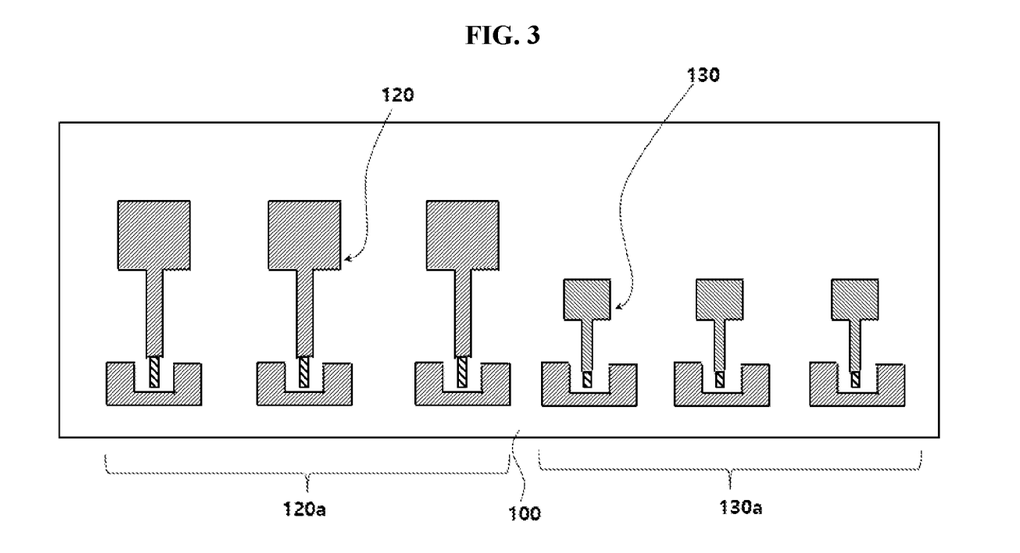
FIG. 3 is a schematic top planar view illustrating an antenna device in accordance with an exemplary embodiment.

FIG. 3 is a schematic top planar view illustrating an antenna device in accordance with an exemplary embodiment.

Referring to FIG. 3, a first antenna unit group 120a including a plurality of the first antenna units 120 and a second antenna unit group 130a including a plurality of the second antenna units 130 may be disposed are on the dielectric layer 100. The first antenna unit group 120a and the second antenna unit group 130a may be alternately and repeatedly arranged on the dielectric layer 100.

In an embodiment, two or more first antenna units 120 may be physically separated from each other and disposed adjacent to each other in the first antenna unit group 120a, and two or more second antenna units 130 may be physically separated from each other and disposed adjacent to each other in the second antenna unit group 130a.

As described above, the first antenna unit 120 and the second antenna unit 130 may have different sizes and different resonant frequencies. According to an embodiment illustrated in FIG. 3, the predetermined number of the antenna unit having the same resonant frequency may be disposed adjacent to each other to improve an antenna gain or a radiation density. Further, a radiation coverage may be enhanced by alternately arranging the first antenna group 120a and the second antenna group 130a.

Figure 4:
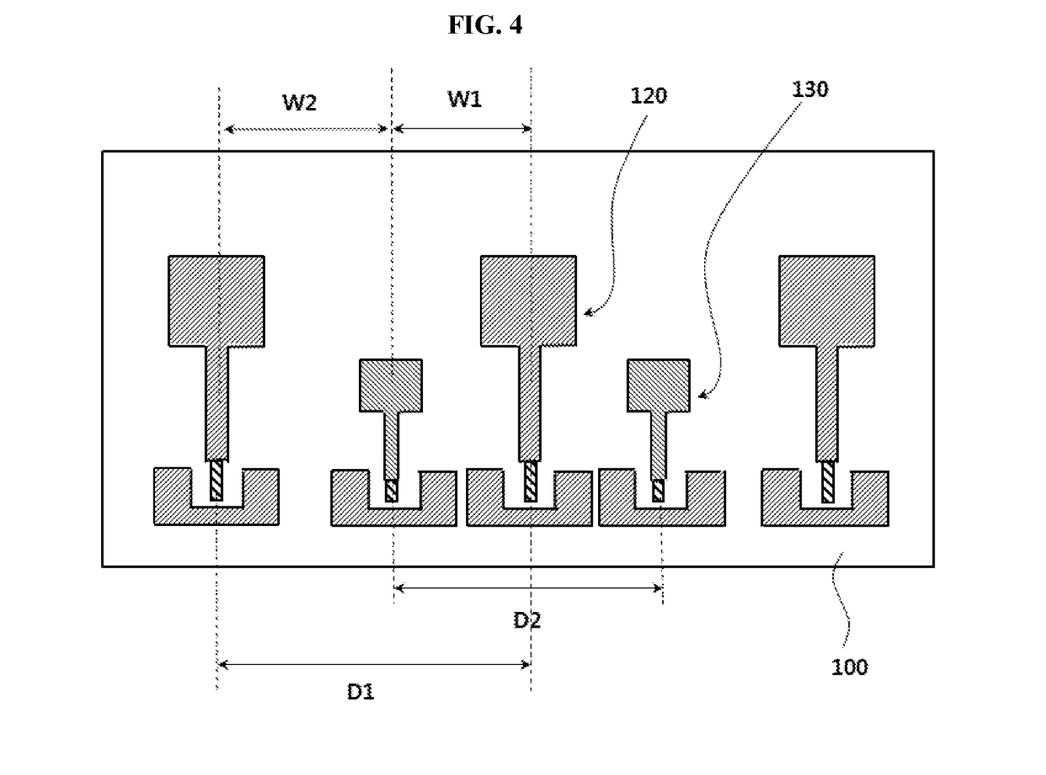
FIG. 4 is a schematic top planar view illustrating an antenna device in accordance with some exemplary embodiments.

FIG. 4 is a schematic top planar view illustrating an antenna device in accordance with some exemplary embodiments.

Referring to FIG. 4, the first antenna units 120 may be arranged to satisfy a first spacing distance D1 (e.g., a distance between central lines of the first radiators 122), and the second antenna units 130 may be arranged to satisfy a second spacing distance D2 (e.g., a distance between central lines of the second radiators 132).

In exemplary embodiments, the second spacing distance D2 of the second antenna units 130 having the relatively high frequency band may be less than the first spacing distance D1 of the first antenna units 120 having the relatively low frequency band.

In this case, the distance between the first antenna unit 120 and the second antenna unit 130 may be non-uniform. For example, in FIG. 4, a distance W1 between the second antenna unit 130 and the first antenna unit 120 disposed at a right side of the second antenna unit 130 may be smaller than a distance W2 between the second antenna unit 130 and the first antenna units 120 disposed at a left side of the second antenna unit 130.

Figure 5:
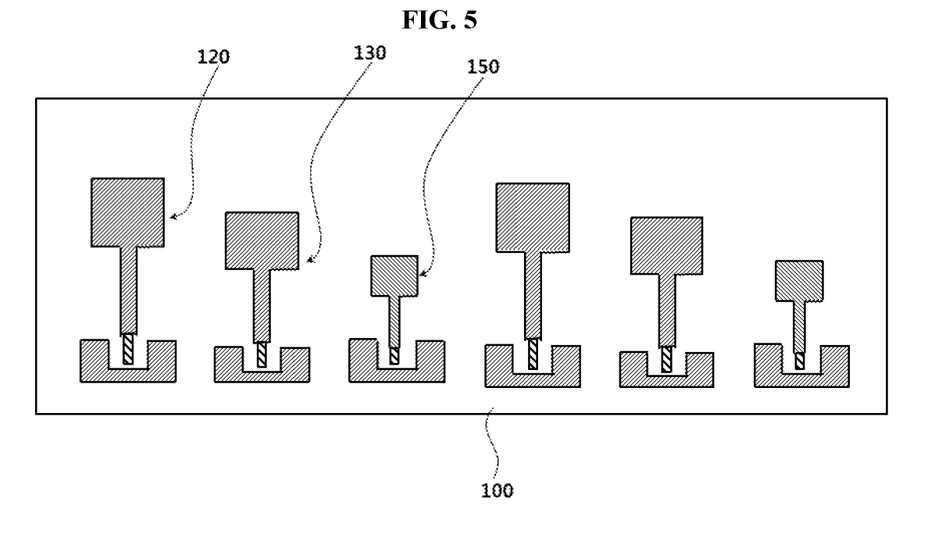
FIG. 5 is a schematic top planar view illustrating an antenna device in accordance with some exemplary embodiments.

Accordingly, the distance between the first antenna unit 120 and the second antenna unit 130 may be adjusted to satisfy the desired first spacing distance D1 and the second spacing distance D2 so that desired radiation properties may be achieved without causing a signal interruption and without increasing a size of the antenna device FIG. 5 is a schematic top planar view illustrating an antenna device in accordance with some exemplary embodiments.

Referring to FIG. 5, the antenna device may include three or more types of antenna units having different lengths/areas.

For example, a first antenna unit 120, a second antenna unit 130 and a third antenna unit 150 may be sequentially, alternately and repeatedly arranged on the dielectric layer 100. The third antenna unit 150 may have a smaller length or area than that of the second antenna unit 130. Accordingly, a sequential arrangement of antenna units where length/areas may decrease in an order of the first antenna unit 120, the second antenna unit 130 and the third antenna unit 150 may be repeated.

In some embodiments, the first antenna unit 120, the second antenna unit 130, the third antenna unit 150 and a fourth antenna unit (not illustrated) may be sequentially, alternately and repeatedly arranged on the dielectric layer 100. The number of antenna units having different shapes or types may be appropriately determined in consideration of a coverage through the antenna device, an accommodation space of the display device, etc.

Figure 6:
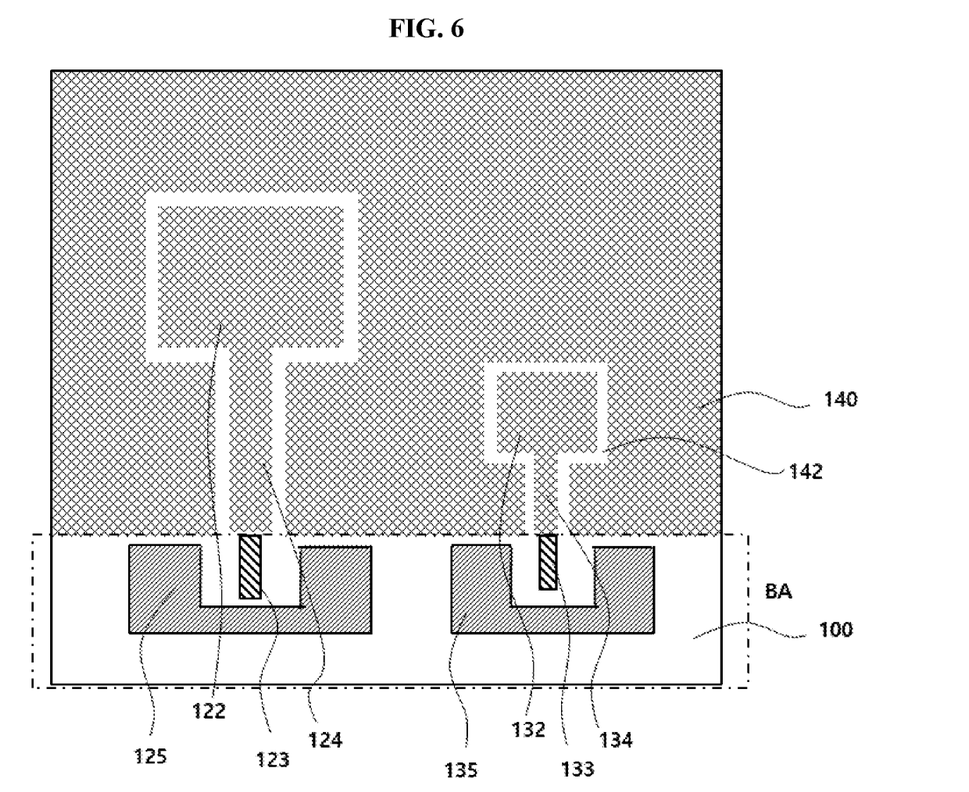
FIG. 6 is a schematic top planar view illustrating an antenna device in accordance with some exemplary embodiments.

FIG. 6 is a schematic top planar view illustrating an antenna device in accordance with some exemplary embodiments.

Referring to FIG. 6, the radiators 122 and 132 may include a mesh structure. In some embodiments, the transmission lines 124 and 134 may also include a mesh structure. The signal pads 123 and 133 connected to the transmission lines 124 and 134 may have a solid metal pattern shape to reduce a feeding resistance. In an embodiment, at least a portion of the transmission lines 124 and 134 may also include a solid pattern shape.

The radiators 122 and 132 may include the mesh structure, so that transmittance of the antenna device may be improved. Accordingly, even when the radiators 122 and 132 may be located in a display area of the display device, degradation of an image quality may be prevented.

A dummy mesh pattern 140 may be disposed around the radiators 122 and 132.

For example, a conductive layer may be formed on the dielectric layer 100, and then the conductive layer may be etched to form a separation region 142 along a profile of the antenna device together with the formation of the mesh structure. Accordingly, the dummy mesh pattern 140 and the radiators 122 and 132 spaced apart by the separation region 142 may be formed.

In some embodiments, the dummy mesh pattern 140 may also be disposed around the transmission lines 124 and 134. In an embodiment, the dummy mesh pattern 140 may not be formed in the bonding area BA.

The dummy mesh pattern 140 may be disposed around the radiators 122 and 132, so that a visual recognition of electrodes due to local variations of conductive pattern shapes may be suppressed.

Figure 7:
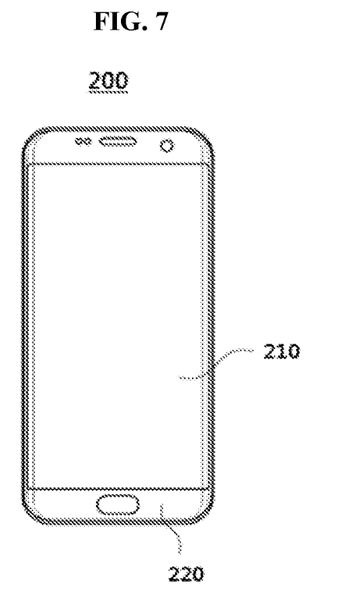
FIG. 7 is a schematic top planar view illustrating a display device in accordance with exemplary embodiments.

FIG. 7 is a schematic top planar view illustrating a display device in accordance with exemplary embodiments. For example, FIG. 7 illustrates an outer shape including a window of a display device.

Referring to FIG. 7, a display device 200 may include a display area 210 and a peripheral area 220. For example, the peripheral area 220 may be positioned at both lateral portions and/or both end portions of the display area 210.

In some embodiments, the above-described antenna device may be inserted into the display device 200 in the form of a patch or film. In some embodiments, at least a portion of the antenna units 120 and 130 of the antenna device as described above may be disposed to at least partially correspond to the display area 210 of the display device 200. In some embodiments, the radiators 122 and 132 may overlap the display area 210, and the bonding area BA of the antenna device in which the signal pads 123 and 133 and the ground pads 125 and 135 are formed may be disposed to correspond to the peripheral area 220.

The peripheral area 220 may correspond to, e.g., a light-shielding portion or a bezel portion of an image display device. Additionally, a driving circuit unit such as the driving IC chip 180 of the display device 200 and/or the antenna device may be disposed in the peripheral area 220.

The signal pads 123 and 133 of the antenna device may be adjacent to the driving circuit unit so that a signal transmission/reception path may be shortened, thereby suppressing a signal loss.

The antenna device may include the antenna units and the dummy mesh pattern 140 including the mesh structure as described above, so that transmittance may be improved while reducing or suppressing the visual recognition of electrodes. Thus, the image quality in the display area 210 may be enhanced while maintaining or improving desired communication reliability.

What is claimed is:

1. An antenna device, comprising:
    a dielectric layer; and
    a plurality of a first antenna unit and a plurality of a second antenna unit alternately and repeatedly disposed on a top surface of the dielectric layer, the first antenna unit and the second antenna unit having different lengths or areas from each other-,
    wherein each of the plurality of the first antenna unit comprises a first radiator, a first transmission line extending from one side of the first radiator and a first signal pad connected to an end portion of the first transmission line, and
    each of the plurality of the second antenna unit includes a second radiator, a second transmission line extending from one side of the second radiator and a second signal pad connected to an end portion of the second transmission line;
    wherein the first radiators are arranged in a row direction to define a first row area, and the second radiators are arranged in the row direction to define a second row area, and
    the first row area and the second row area are separated so as not to overlap each other in a planar view.

2. The antenna device according to claim 1, wherein the second antenna unit has a resonance frequency greater than that of the first antenna unit, and the second antenna unit has an area or a length smaller than that of the first antenna unit.

3. The antenna device according to claim 2, wherein an area of the first radiator is greater than an area of the second radiator, and a length of the first transmission line is greater than a length of the second transmission line.

4. The antenna device according to claim 2, wherein the antenna device comprises a bonding area in which the first signal pads and the second signal pads are disposed, and
    the bonding area, the second row area and the first row area are sequentially allocated so as not to overlap each other in the planar view.

5. The antenna device according to claim 4, further comprising first ground pads disposed adjacent to each of the first signal pads and second ground pads disposed adjacent to each of the second signal pads in the bonding area.

6. The antenna device according to claim 2, wherein the first radiator and the second radiator comprise a mesh structure.

7. The antenna device according to claim 6, further comprising a dummy mesh pattern disposed around the first radiator and the second radiator on the top surface of the dielectric layer.

8. The antenna device according to claim 6, wherein the first signal pad and the second signal pad comprise a solid metal pattern.

9. The antenna device according to claim 2, wherein a spacing distance between neighboring first antenna units of the plurality of the first antenna unit is greater than a spacing distance between neighboring second antenna units of the plurality of the second antenna unit.

10. The antenna device according to claim 9, wherein distances between the first antenna unit and the second antenna unit neighboring each other are non-uniform.

11. The antenna device according to claim 1, further comprising a ground layer disposed on a bottom surface of the dielectric layer.

12. The antenna device according to claim 1, further comprising a third antenna unit disposed on the top surface of the dielectric layer, the third antenna unit having a length or an area different from that of each of the first antenna unit and the second antenna unit.

13. The antenna device according to claim 12, wherein lengths or areas of the first antenna unit, the second antenna unit and the third antenna unit are sequentially decreased, and
    the first antenna unit, the second antenna unit and the third antenna unit are sequentially, alternately and repeatedly arranged on the dielectric layer.

14. The antenna device according to claim 1, wherein the antenna device comprises a first antenna group including a plurality of the first antenna unit and a second antenna group including a plurality of the second antenna unit, and
    the first antenna group and the second antenna group are alternately and repeatedly arranged on the top surface of the dielectric layer.

15. A display device comprising the antenna device according to claim 1.

* * * * *